(12) United States Patent
Takayama et al.

(10) Patent No.: US 7,936,643 B2
(45) Date of Patent: *May 3, 2011

(54) THERMAL ASSISTED MAGNETIC RECORDING HEAD HAVING SURFACE-EMITTING SEMICONDUCTOR LASER

(75) Inventors: Seiichi Takayama, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 12/364,765

(22) Filed: Feb. 3, 2009

(65) Prior Publication Data
US 2010/0195239 A1    Aug. 5, 2010

(51) Int. Cl.
*G11B 11/00*    (2006.01)
(52) U.S. Cl. ............... 369/13.33; 369/13.13; 360/59
(58) Field of Classification Search .............. 360/59; 369/13.33, 13.13, 13.32, 13.17, 112.09, 112.14, 369/112.21, 112.27; 385/129, 31, 88–94; 250/201.3, 201.5
See application file for complete search history.

(56) References Cited

U.S. PATENT DOCUMENTS

| | | | |
|---|---|---|---|
| 5,986,978 A * | 11/1999 | Rottmayer et al. ........ | 369/13.17 |
| 6,016,290 A * | 1/2000 | Chen et al. ............... | 369/13.17 |
| 6,404,706 B1 * | 6/2002 | Stovall et al. ............ | 369/13.17 |
| 6,795,630 B2 | 9/2004 | Challener et al. | |
| 6,944,112 B2 | 9/2005 | Challener | |
| 7,155,732 B2 * | 12/2006 | Rausch et al. ............ | 720/659 |
| 7,266,268 B2 | 9/2007 | Challener et al. | |
| 7,580,602 B2 * | 8/2009 | Itagi et al. ............... | 385/37 |
| 2004/0001420 A1 | 1/2004 | Challener | |
| 2005/0041950 A1 * | 2/2005 | Rottmayer et al. ......... | 385/147 |
| 2005/0052771 A1 * | 3/2005 | Rausch et al. ............ | 360/59 |
| 2005/0078565 A1 * | 4/2005 | Peng et al. ................ | 369/13.32 |
| 2005/0122850 A1 | 6/2005 | Challener et al. | |
| 2005/0135008 A1 * | 6/2005 | Challener et al. ......... | 360/128 |
| 2005/0289576 A1 * | 12/2005 | Challener ................ | 720/658 |
| 2006/0005216 A1 * | 1/2006 | Rausch ..................... | 720/659 |
| 2006/0119983 A1 * | 6/2006 | Rausch et al. ............ | 360/128 |
| 2007/0109919 A1 * | 5/2007 | Yokoyama et al. ........ | 369/13.24 |
| 2007/0165495 A1 * | 7/2007 | Lee et al. .................. | 369/13.33 |
| 2007/0177302 A1 * | 8/2007 | Shimazawa et al. ....... | 360/126 |
| 2008/0002298 A1 | 1/2008 | Sluzewski | |
| 2008/0117727 A1 * | 5/2008 | Matsumoto ............... | 369/44.14 |

(Continued)

FOREIGN PATENT DOCUMENTS

JP    A-10-162444    6/1998

(Continued)

OTHER PUBLICATIONS

Jun. 24, 2010 Office Action issued in U.S. Appl. No. 12/363,010.

(Continued)

*Primary Examiner* — Tan X Dinh
(74) *Attorney, Agent, or Firm* — Oliff & Berridge, PLC (57) ABSTRACT

The present thermally assisted magnetic head has: a plasmon antenna; an optical wave guide having the plasmon antenna installed at the tip thereof; a diffraction grating which is disposed in or on the optical wave guide; and a laser element which is disposed at a position to irradiate laser beams onto the diffraction grating, and is composed of a photonic crystal surface emitting semiconductor layer. A laser light intensity distribution on the diffraction grating has at least two intensity peaks in the width direction of the optical wave guide. The two-dimensional form of the laser light intensity distribution on the diffraction grating is a ring or two ellipses.

2 Claims, 10 Drawing Sheets

U.S. PATENT DOCUMENTS

| | | | |
|---|---|---|---|
| 2008/0158709 A1* | 7/2008 | Tanaka et al. | 360/59 |
| 2008/0205202 A1* | 8/2008 | Komura et al. | 369/13.02 |
| 2008/0232225 A1 | 9/2008 | Cho et al. | |
| 2009/0245034 A1* | 10/2009 | Sekine et al. | 369/13.02 |

FOREIGN PATENT DOCUMENTS

| | | |
|---|---|---|
| JP | A-2001-255254 | 9/2001 |
| JP | A-2005-317178 | 11/2005 |
| JP | A-2006-185548 | 7/2006 |

OTHER PUBLICATIONS

Jun. 25, 2010 Office Action issued in U.S. Appl. No. 12/369,991.
Sep. 30, 2010 Office Action issued in U.S. Appl. No. 12/363,010.
U.S. Appl. No. 12/363,010, filed Jan. 30, 2009.
U.S. Appl. No. 12/369,991, filed Feb. 12, 2009.

* cited by examiner

THERMAL ASSISTED MAGNETIC RECORDING HEAD HAVING SURFACE-EMITTING SEMICONDUCTOR LASER

BACKGROUND OF THE INVENTION

1. Field of the Invention

The present invention relates to a thermally assisted magnetic head comprising a diffraction grating to which laser beams having a plurality of intensity peaks are irradiated.

2. Related Background Art

As recording densities of hard disk devices increase, a further improvement of performance of thin film magnetic heads is demanded. A widely used thin film magnetic head is a composite type thin film magnetic head in which a magnetic detection element, such as a magneto-resistance (MR) effect element, and magnetic recording element, such as an electromagnetic coil element, are layered, and data signals are read from/written to a magnetic recording medium, such as a magnetic disk.

A magnetic recording medium is normally a discrete body in which magnetic particles aggregate, and each magnetic particle has a single magnetic domain structure. Here one recording bit consists of a plurality of magnetic particles. Therefore in order to increase recording density, the magnetic particles must be smaller and bumps on the boundaries of the recording bits must be decreased. If the magnetic particles become smaller, however, a problem is that a drop in heat stability of magnetization occurs due to the decrease of volume.

Heat stability of magnetization is measured by $K_U V/k_B T^-$. Here $K_U$ is magnetic anisotropy energy of the magnetic particle, $V$ is a volume of one magnetic particle, $k_B$ is a Boltzmann's constant, and $T$ is an absolute temperature. Decreasing the size of a magnetic particle means decreasing $V$, and in this state $K_U V/k_B T$ decreases and heat stability is affected. A possible way to solve this problem is increasing $K_U$ at the same time, but increasing $K_U$ increases the holding power of the magnetic medium. The write magnetic field strength of a magnetic head, on the other hand, is roughly determined by a saturation magnetic flux density of soft magnetic material constituting the magnetic poles in the head. Therefore if the holding power exceeds an allowable value determined based on the limit of this write magnetic field strength, writing becomes impossible.

As a method to solve the problem of heat stability of magnetization, a thermally assisted magnetic recording method, in which a magnetic material with high $K_U$ value is used and at the same time data is written with decreasing the holding power by heating the recording medium immediately before applying the write magnetic field, has been proposed. This method is roughly classified into a magnetic dominant recording method and a light dominant recording method. In the magnetic dominant recording method, the major write element is an electromagnetic coil element, and an emission diameter of the light is greater than the track width (recording width). In the case of the light dominant recording method, the major write element is a light irradiation portion, where the irradiation diameter of the light is roughly the same as the track width (recording width). In other words, the spatial resolution depends on the magnetic field in the case of the magnetic dominant recording method, while the spatial resolution depends on the light in the case of the light dominant recording method.

U.S. Pat. No. 6,944,112 and Japanese Patent Application Laid-Open No. 2005-317178 disclose a hard disk device comprising a light source, such as a semiconductor laser, and a thermally assisted magnetic head. In the case of the hard disk device according to U.S. Pat. No. 6,944,112, a light source is disposed at a position distant from the thermally assisted magnetic head. The light emitted from this light source is irradiated onto an optical wave guide in the thermally assisted magnetic head, and is guided to a near field light generation unit (plasmon antenna) disposed on a medium facing surface. The magnetic recording medium is heated by the near field light generated from the near field light generation unit, thereby thermally assisted magnetic recording is performed.

In the case of the hard disk device according to Japanese Patent Application Laid-Open No. 2005-317178, a semiconductor laser, which is a light source, and a thermally assisted magnetic head, are integrated. Thermally assisted magnetic recording is performed by directly irradiating the emission light from the light source onto the magnetic recording medium for heating.

The laser beams contact the diffraction grating, deflect there, propagate through the wave guide, and are partially condensed to the plasmon antenna. However in the case of conventional head, a magnetic pole for recording penetrates through the center of the optical wave guide, and interrupts laser propagation by absorbing or scattering the laser beams. This magnetic pole for recording absorbs or scatters the laser beams, which makes it difficult for laser beams with sufficient intensity to be irradiated onto the plasma antenna, and makes the intensity of the near field light generated from the plasmon antenna insufficient.

SUMMARY OF THE INVENTION

With the foregoing in view, a thermally assisted magnetic head of the present invention has a laser light intensity distribution having two intensity peaks in the track width direction, with an obstruction element position as a trough, so as to prevent attenuation of the laser beams due to the element that obstructs the laser light propagation, such as a magnetic pole for recording. In other words, the thermally assisted magnetic head of the present invention has a plasmon antenna, an optical wave guide having the plasmon antenna installed at the tip thereof, a diffraction grating which is disposed in or on the optical wave guide, and a laser element which is disposed at a position to irradiate laser beams onto the diffraction grating, and is composed of a photonic crystal surface emitting semiconductor laser, wherein a laser light intensity distribution in an area in which the diffraction grating is disposed has at least two intensity peaks in the width direction of the optical wave guide.

According to this thermally assisted magnetic head, the laser beams irradiated onto the diffraction grating are diffracted in a desired way, propagate through the optical wave guide, and are irradiated onto the plasmon antenna. Here the laser element is composed of a photonic crystal surface emitting laser, which irradiates the laser beams having a laser intensity distribution which has two peaks, of which trough is an element (absorber) position where laser beams are obstructed, onto the optical wave guide. When the laser beams propagate, the absorber is disposed at a position of the trough. Therefore the laser light quantity to be irradiated onto the absorber decreases. Since the laser light intensity distribution of the two peaks is not attenuated by the absorber, many laser beams which did not attenuate are condensed onto the plasmon antenna, preferably by a reflector disposed on the side face of the wave guide, and as a result, a near field light at high intensity can be generated from the plasmon antenna.

It is preferable that the two-dimensional form of the laser light intensity distribution on the area in which the diffraction grating is disposed is a ring. In this case, the laser light intensity distribution in an area in which the diffraction grating is disposed has two intensity peaks in the width direction of the optical wave guide. In other words, the laser light intensity distribution in the laser light irradiation area has two intensity peaks, of which trough is the absorber position in the track width direction, therefore the above mentioned function is implemented.

The two-dimensional form of the laser light intensity distribution on the area in which the diffraction grating is disposed can be two ellipses, which are separated in the width direction of the optical wave guide. In this case, the laser light intensity distribution in the area where the diffraction grating is disposed has two intensity peaks, of which trough is the absorber position in the track width direction of the optical wave guide, therefore the above mentioned function is implemented.

It is preferable that the laser element is a photonic crystal surface emitting semiconductor laser. In the case of the photonic crystal surface emitting semiconductor laser, a desired two-dimensional form of the laser beam can be acquired by changing the cyclic structure of the photonic crystal layer, which is preferable to implement the above mentioned light intensity distribution.

It is preferable that the photonic crystal surface emitting semiconductor laser has a bottom clad layer which is a compound semiconductor, a top clad layer which is a compound semiconductor, an active layer disposed between the bottom clad layer and top clad layer, and a photonic crystal layer disposed between the top clad layer and active layer. If this structure is used, the two-dimensional form of the laser beam can be determined by the structure of the photonic crystal layer.

The photonic crystal layer has a plurality of through holes penetrating in the thickness direction, and a two-dimensional form of each through hole can be a circle. In this case, the two-dimensional form of the emitted laser beams can be a circle, an ellipse or ring.

The photonic crystal layer has a first area and a second area, each of the first and second areas has a plurality of through holes penetrating in a thickness direction, and a two-dimensional form of each through hole is a triangle, the first and second areas being separated by a distance greater than the distance between adjacent through holes in each area. In this case, two elliptical (includes circular) laser light intensity distributions can be formed in two areas, including the diffraction grating, corresponding to the first area and second area.

If a magnetic pole to be an obstruction is disposed on an extension of the trough portion of the laser light intensity distribution, scattering of the laser beams by this magnetic pole is suppressed, and the laser beams can be efficiently condensed to the plasmon antenna.

DESCRIPTION OF THE PREFERRED EMBODIMENTS

A thermally assisted magnetic head, head gimbal assembly, and hard disk device according to an embodiment will now be described with reference to the accompanying drawings. Identical composing elements are denoted with identical symbols if possible.

Figure 1:
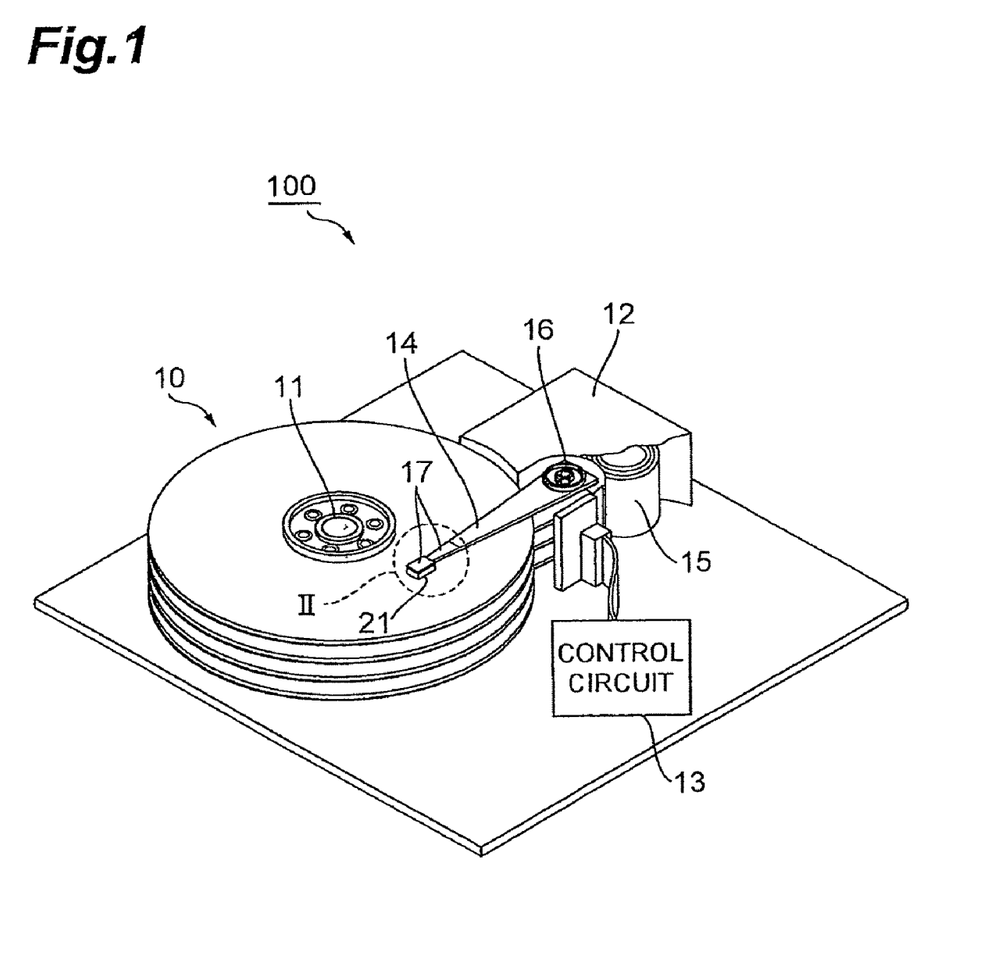
FIG. 1 is a perspective view depicting a hard disk device according to an embodiment.

FIG. 1 is a perspective view depicting a hard disk device according to an embodiment.

The hard disk device 100 has a magnetic disk 10 which is comprised of a plurality of magnetic recording media which rotate around a rotation axis of a spindle motor 11, an assembly carriage device 12 which positions the thermally assisted magnetic head 21 on a track, and a recording/playback and emission control circuit (control circuit) 13 for controlling the read/write of the thermally assisted magnetic head 21 and controlling a laser diode as a light source for generating laser beams for thermally assisted magnetic recording, which will be described later.

In the assembly carriage device 12, a plurality of drive arms 14 are disposed. These drive arms 14 can be moved around a pivot bearing shaft 16 by a voice coil motor (VCM) 15, and are layered in a direction along this shaft 16. At the tip of each drive arm 14, a head gimbal assembly (HGA) 17 is installed. In each HGA 17, the thermally assisted magnetic head 21 is installed so as to face the surface of each magnetic disk 10. The surface facing the surface of the magnetic disk 10 is a medium facing surface S (also called air bearing surface) of the thermally assisted magnetic head 21. The magnetic disks 10, drive arms 14, HGA 17 and thermally assisted magnetic heads 21 may be singular.

Figure 2:
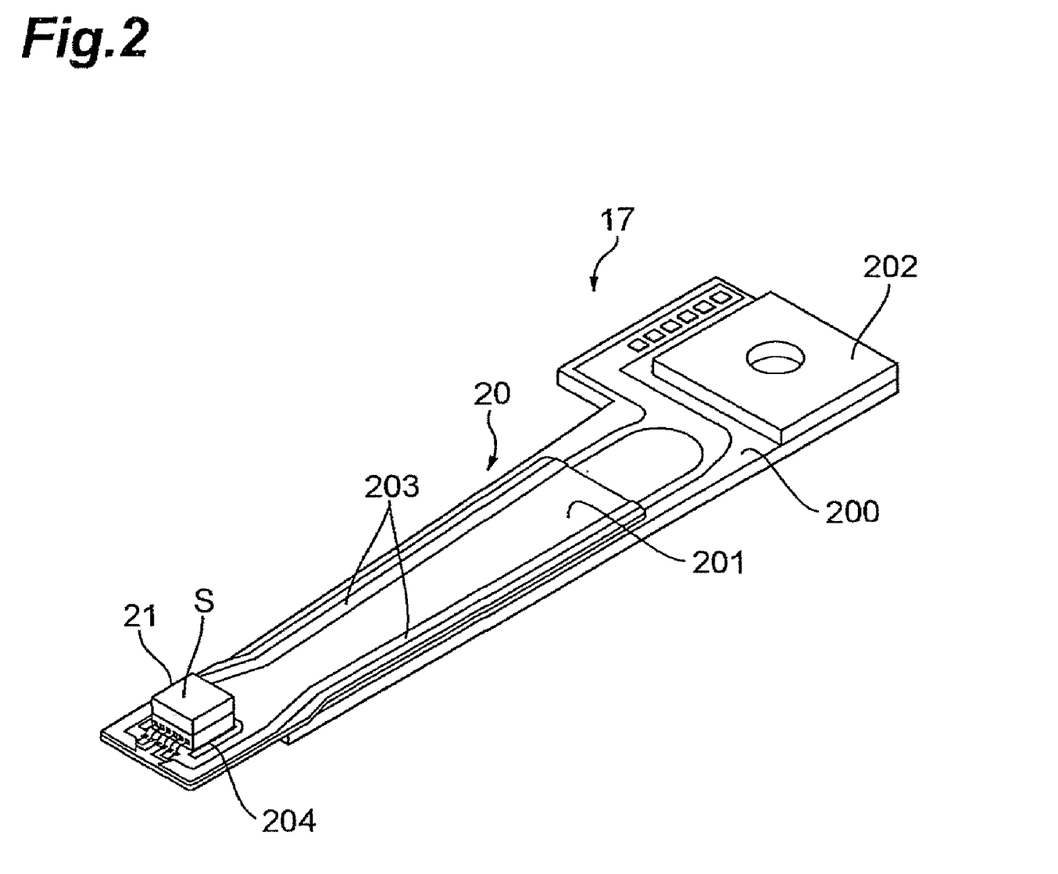
FIG. 2 is a perspective view depicting HGA.

FIG. 2 is a perspective view of HGA. In FIG. 2, the medium facing surface S of HGA 17 faces upward.

In the HGA 17, the thermally assisted magnetic head 21 is secured at the tip of the suspension 20, and one end of a wiring element 203 is electrically connected to a terminal electrode of the thermally assisted magnetic head 21. The suspension 20 is comprised of a load beam 200, a flexure 201 which is secured and supported on the load beam 200 and which has elasticity, a tongue portion 204 which is formed like a plate spring at the tip of the flexure, a base plate 202 which is disposed at the base of the load beam 200, and a wire element 203 which is disposed on the flexure 201 and is further comprised of a lead conductor and connection pads electrically connected to both ends thereof.

The structure of the suspension in the HGA 17 is not limited to the above mentioned structure. An IC chip for driving the head, which is not illustrated, may be installed in the middle of the suspension 20.

Now the thermally assisted magnetic head according to an embodiment will be described.

Figure 3:
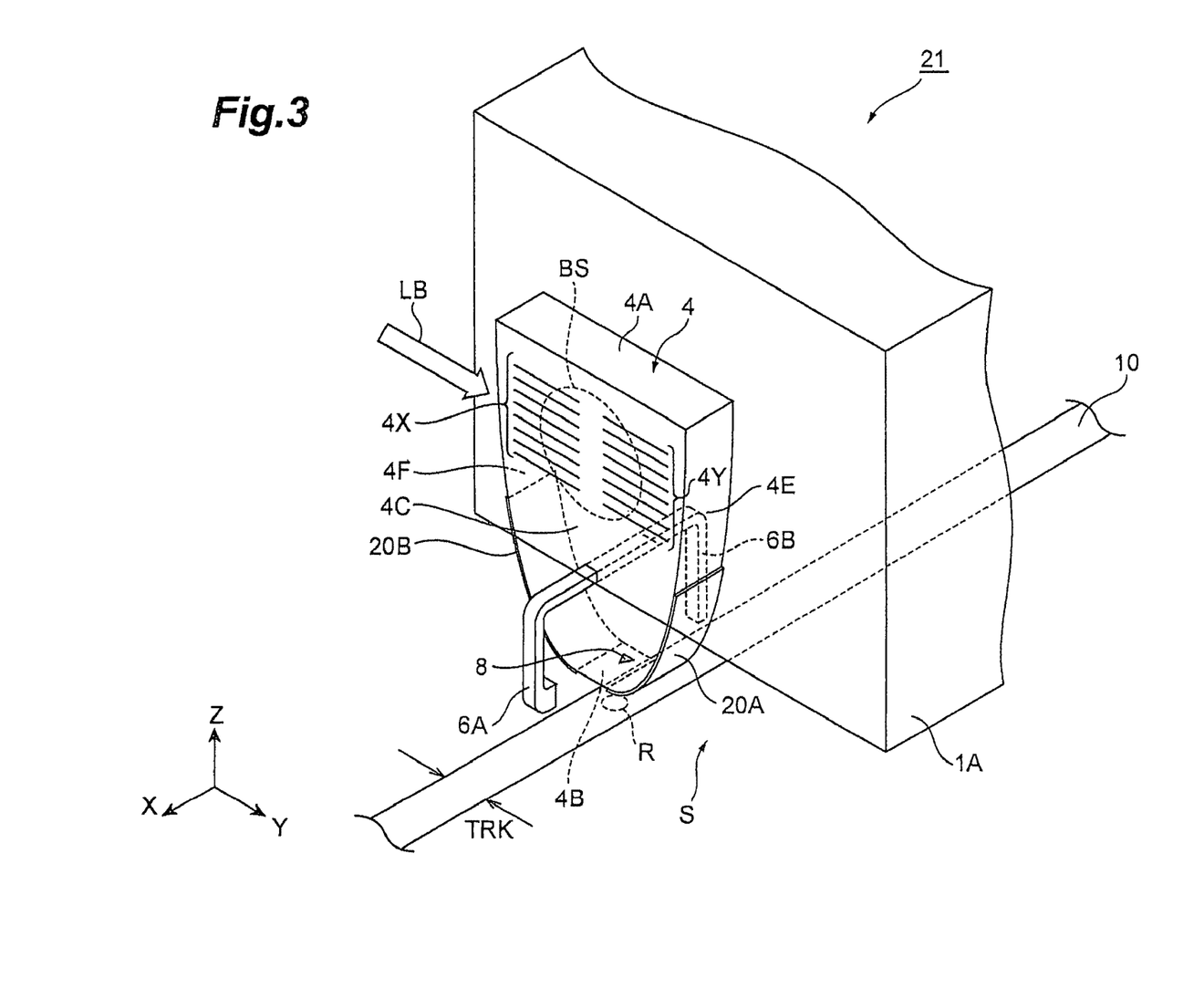
FIG. 3 is an enlarged perspective view depicting an area near a thermally assisted magnetic head of the HGA shown in FIG. 2.
Figure 4:
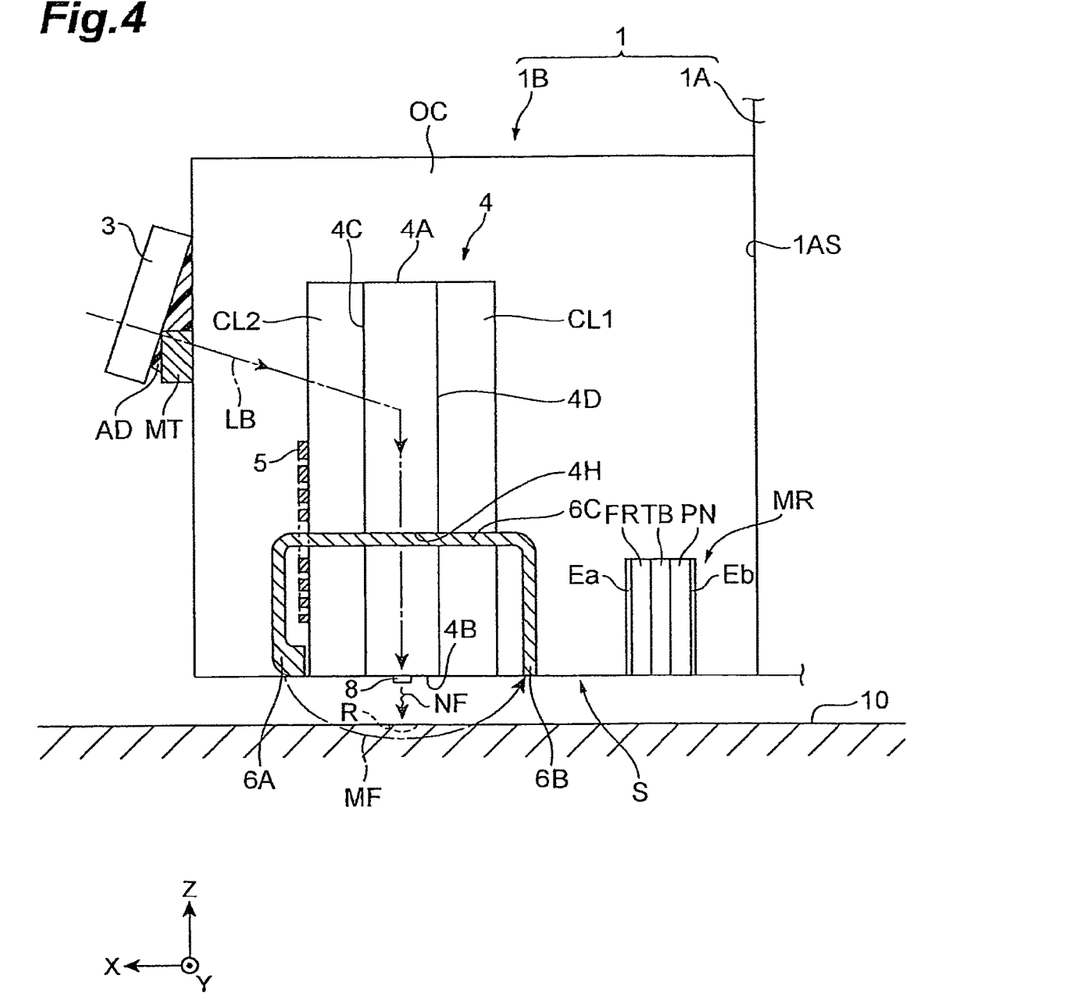
FIG. 4 is a vertical cross-sectional view depicting the thermally assisted magnetic head shown in FIG. 3.

FIG. 3 is an enlarged perspective view of an area near the thermally assisted magnetic head of the HGA shown in FIG. 2, and FIG. 4 is a vertical cross-sectional view depicting the thermally assisted magnetic head shown in FIG. 3. In FIG. 3 and FIG. 4, a rectangular coordinate system is shown, where the Y axis is a direction of the track width TRK, and the X axis is a direction which is perpendicular to the Y axis, and is in parallel with the medium facing surface S. The positive direction of the X axis is set in the trailing direction (downstream direction in which the magnetic recording medium 10 moves from the magnetic head), and the negative direction of the X axis is set in the leading side (upstream direction in which the magnetic recording medium 10 moves to the magnetic head). The rectangular coordinate system corresponding to FIG. 3 and FIG. 4 is shown when necessary in FIG. 5 and later drawings.

As FIG. 2 shows, the thermally assisted magnetic head 21 is installed at the tip of the suspension 20, and the thermally assisted magnetic head 21 has a slider 1 and a surface emitting semiconductor laser (laser element) 3, as shown in FIG. 4. The overall size of the slider 1 is bigger than the one shown in FIG. 3, and various processings are performed on the medium facing surface S thereof. In FIG. 3, such elements as the coil 5 and the surface emitting semiconductor laser 3, shown in FIG. 4, are omitted to clearly explain the major composing elements.

The XY plane of the slider 1 in the negative direction of the Z axis forms the medium facing surface S. As FIG. 4 shows, the slider 1 is comprised of a slider substrate 1A where a part of the medium facing surface S is formed, and a magnetic head portion 1B on which another part of the medium facing surface S is formed. The slider substrate 1A is made from Altic ($Al_2O_3$—TiC), for example.

As FIG. 4 shows, the magnetic head portion 1B has a plurality of elements buried in a protective layer OC which is made of an insulator. These elements are a spiral coil 5 which generates a magnetic field for writing information by supplying current, magnetic poles 6A, 6B and 6C which extend from the center of the coil so as to guide the magnetic flux generated in the coil 5 to the medium facing surface S, a magneto-resistance effect element MR which has a magnetic sensitive surface exposed to the medium facing surface S, a core 4 of the optical wave guide which extends in the Z axis direction with the surrounding insulator as clads CL1 and CL2, and diffraction gratings 4X and 4Y shown in FIG. 3. The diffraction gratings 4X and 4Y may be continuous, or the positions thereof may be shifted so that a phase difference is generated in the lights which propagate along the light traveling direction. A resistor, such as a heater, may be formed inside the protective layer OC if necessary. The clad CL1 contacts the bottom surface 4D of the core 4, and the clad CL2 contacts the top surface 4C of the core 4.

The magnetic head portion 1B is comprised of these elements, which are layered in the direction along the X axis, and this layering direction is along the array direction of the recording area R in a track, and the track width TRK is parallel with the Y axis.

The magneto-resistance effect element MR is buried in the protective layer OC formed on the layered surface 1AS of the slider substrate 1A, as shown in FIG. 4. The protective film OC is made of Almina ($Al_2O_3$), for example. The magneto-resistance effect element MR is comprised of a top shield electrode Ea, bottom shield Eb, and a magneto-resistance effect layer which exists between the top shield electrode Ea and the bottom shield electrode Eb. This magneto-resistance effect layer is a layered body in which a non-magnetic intermediate layer is disposed between two magnetic layers, and is comprised of a non-magnetic intermediate layer TB which exists between a magnetization free layer FR and a magnetization fixed layer PN, for example. The non-magnetic intermediate layer TB is a tunnel barrier layer which is an insulator, or a non-magnetic metal layer, for example, and constitute a TMR element and GMR element.

The magnetic poles 6A, 6B and 6C are buried in the protective layer OC. The main magnetic pole 6A extends along the Z axis direction, and the end face thereof is exposed to the medium facing surface S. The main magnetic pole 6A is made of ferro-magnetic material, such as an alloy of two or three of Ni, Fe and Co, or an alloy to which a predetermined element is added to these elements as the main component.

When current is supplied to the coil 5, a magnetic field for writing information is generated from the coil 5. The main magnetic pole 6A guides the magnetic field for writing information from the internal magnetic pole 6C to the end face of the main magnetic pole 6A, and generates the magnetic field for writing information from this end face to the recording area R on the surface of the magnetic disk 10. The internal magnetic pole 6C penetrates the core 4 in the thickness direction, and positions at the center of the core 4 in the width direction (Y axis direction). The internal magnetic pole 6C positions inside a through hole 4H.

A sub-magnetic pole 6B made of ferro-magnetic material is disposed, if necessary, at a position slightly away from the main magnetic pole 6A in the positive direction of the X axis or negative direction of the X axis from the main magnetic pole 6A, so that the magnetic line of force (magnetic flux) MF from the main magnetic pole 6A flows into the sub-magnetic pole 6B via the recording area R. The main magnetic pole 6A need not be exposed to the medium facing surface S, only if it is in a position where the write magnetic field can be provided from the end face at the medium facing surface S side to the recording area R on the surface of the magnetic disk 10.

The core 4 of the optical wave guide is buried in the protective layer OC, and extends along the Z axis direction. The core 4 of the optical guide has a first light emitting surface 4B on the medium facing surface S, and has a second light emitting surface 4A on the XY plane in the positive direction of the Z axis. An optical monitor can be disposed, if necessary, on the second light emitting surface 4A.

The diffraction gratings 4X and 4Y are disposed in the core 4 or on the core 4 of the optical wave guide. In the present embodiment, the diffraction gratings 4X and 4Y are formed inside the core 4 of the optical wave guide, but may be formed in the top clad CL2 or in the protective layer OC on the light entering path, separately from the core 4, only if it has a function to deflect the optical path.

The core 4 of the optical wave guide is comprised of the surrounding clad layers CL1 and CL2, and an insulator having a higher refractive index than the protective layer OC. An example is (tantalum oxide ($TaO_x$), almina ($Al_2O_3$)) $SiO_xN_y$, and $SiO_2$, where A is a material of the core 4 of the optical wave guide, B is a material of the clads CL1 and CL2 and protective layer OC, and (A, B) is a combination of A and B. The suffixes X and Y indicate an appropriate composition ratio.

The core 4 of the optical weave guide has a plate form of which thickness direction is the X axis direction. Viewed from the X axis direction, the core 4 of the optical wave guide has a symmetric axis which is parallel with the Z axis, and has a parabolic form of which vertex is outside the medium facing surface S, and of which portion near the vertex is cut in parallel with the XY plane. The cutting plane in parallel with the XY plane near the vertex of the core 4 of the optical wave guide is the first light emitting surface 4B. A plasmon antenna 8 is disposed on the first light emitting surface 4B as a near field light emitting portion. The plasmon antenna 8 is made of metal. It is preferable that the plasmon antenna 8 is disposed at or near the focal point position of the parabolic form of the core 4 of the optical wave guide. The surface facing the first light emitting surface 4B of the core 4 of the optical wave guide is the second light emitting surface 4A.

The thickness of the core 4 of the optical wave guide in the X axis direction is 0.07 to 2 μm, for example. The length of the first light emitting surface 4B in the Y axis direction is 0.07 to 2 μm, for example, and the length of the second light emitting surface 4A in the Y axis direction is 5 to 50 μm, for example.

As FIG. 3 show, the pair of diffraction gratings 4X and 4Y are disposed on the YZ plane 4C of the core 4 of the optical wave guide in the positive direction of the X axis, so that the diffraction gratings 4X and 4Y are separated from each other along the Y axis direction, and become symmetric with respect to the center axis of the core 4 of the optical wave guide. Each diffraction grating 4X and 4Y of a pair has a layered structure where a high refractive index layer made of a high refractive index insulator and a low refractive index layer made of a low refractive index insulator are alternately layered many times in a direction along the Z axis. Therefore in each diffracting grating 4X and 4Y of a pair, the refractive index cyclically changes along the Z axis direction. An example is ($TaO_x$, $Al_2O_3$) and ($SiO_xN_y$, $SiO_2$), where C is a material of the high refractive index layer and D is a material of the low refractive index layer, and (C, D) is a combination thereof.

To form the optical wave guide diffraction grating generally, the core is fabricated from quartz glass to which Ge is added, and processing to change the refractive index is performed by irradiating ultraviolet onto this core.

The thickness of each diffraction grating 4X and 4Y in the X axis direction is 0.1 to 1 μm, and the length in the Z axis direction is 30 to 100 μm, and the width in the Y axis direction is 2 to 24 μm, for example. The lengths of the high refractive index layer and low refractive index layer in the Z axis direction are values close to a wavelength of the laser beam LB, and are, for example, 200~1000 nm respectively.

As FIG. 4 shows, the surface emitting semiconductor laser 3 is secured on the YZ plane of the protective layer OC in the positive direction of the X axis. The laser beam emitting direction of the surface emitting semiconductor laser 3 is tilted from the X axis direction, so that the laser beams LB can be easily guided into the core 4. A part of the surface emitting semiconductor laser 3 is on the mount MT, which is secured on the YZ plane of the protective layer OC, so that the surface emitting semiconductor laser 3 is secured on the protective layer OC via such an adhesive AD as UV curable resin.

It is preferable that the UV curable resin AD is made from a material of which refractive index or dielectric constant is lower than the protective layer OC, so that the laser beams LB can be guided to the inside more easily.

The laser beams LB propagate inside the protective layer OC, and enter the diffraction gratings 4X and 4Y. The diffraction gratings 4X and 4Y optically couple at least a part of the entered laser beams LB with the core 4 of the optical wave guide. A part of the laser beams LB advances inside the core 4 of the optical wave guide in the negative direction of the Z axis, and is irradiated to the plasmon antenna 8. If the plasmon antenna 8 is disposed at the focal point position in the parabolic form of the core 4 of the optical wave guide, or at a location nearby, the laser beams propagate inside the core 4 of the optical guide in parallel with the negative direction of the Z axis, and the laser beams which are fully reflected on the interface between the core 4 of the optical wave guide, and the insulator layer propagate to the plasmon antenna 8, so the laser beams are efficiently irradiated onto the plasmon antenna 8. Both side faces 4E and 4F of the core 4 in the Y axis direction form a parabola on the YZ plane, and reflection films 20A and 20B shown in FIG. 3 are formed on the side faces 4E and 4F. The reflection films 20A and 20B are made of Al, for example, but may be omitted. The reflection films 20A and 20B end near the vertex of the parabola, and the plasmon antenna 8 is disposed in this position.

The plasmon antenna 8 generates near field light NF resonating with the entered laser beam LB, and the recording area R is heated by this near field light NF. The tip of the main magnetic pole 6A positions contacting the plasmon antenna 8, therefore if the recording area R of the magnetic recording medium is heated by the near field light generated from the plasmon antenna 8, the recording magnetic field MR from the main magnetic pole 6A can be applied to the recording area R before the temperature of the recording area R returns to the original temperature.

The plasmon antenna 8 is disposed on the first light emitting surface 4B. The form of the plasmon antenna 8 is a triangular plate having three vertexes on the medium facing surface S (XY plane).

The plasmon antenna 8 is disposed in the negative direction of the Z axis from the main magnetic pole 6A. One vertex of the plasmon antenna 8 and the main magnetic pole 6A closely face each other on the medium facing surface S. The distance of the first vertex, which is a vertex of the plasmon antenna 8 and of which distance to the main magnetic pole 6A is smallest, is 0.01 to 0.2 μm, for example.

The thickness (thickness in Z axis direction) of the plasmon antenna 8 is 0.01 to 0.2 μm, for example. The length of the side between adjacent vertexes of the plasmon antenna 8 is 0.01 to 0.5 μm, for example.

Charges concentrate in the plasmon antenna 8 when the laser beams LB are emitted to the plasmon antenna 8, and the near field light NF is irradiated from the plasmon antenna 8 to the magnetic recording medium 1. The concentration of charges occur most strongly at a vertex having a smallest interior angle out of the vertexes of the plasmon antenna 8. Therefore it is preferable that the interior angle of the first vertex of the plasmon antenna, which is closest to the main magnetic pole 6A, is smaller than the interior angles of the other vertexes. Thereby the time from heating the recording area R of the magnetic recording medium to providing the magnetic line of force MF from the main magnetic pole 6A to the recording area R can be decreased.

Also according to the present embodiment, the plasmon antenna 8 is disposed in the negative direction of the X axis, which is the reading side from the main magnetic pole 6A, so the time from heating the recording area R of the magnetic recording medium to providing the magnetic line of force MF from the main magnetic pole 6A to the recording area R can be decreased.

As a material of the plasmon antenna 8, such metal as gold (Au), silver (Ag), copper (Cu), iridium (Ir), magnesium (Mg), platinum (Pt), aluminum (Al) and palladium (Pd) or an alloy containing at least one of these metals can be used.

Now the irradiation area BS of the laser beams LB in the area where the diffraction gratings 4X and 4Y are disposed will be described.

Figure 5A:
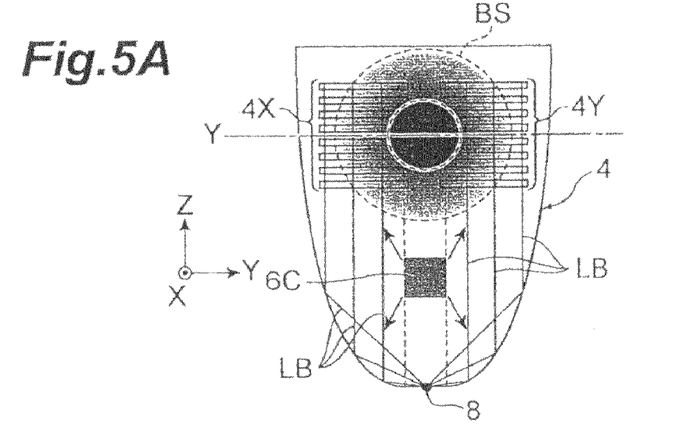
FIG. 5A is a plan view depicting an optical wave guide (core).
Figure 6A:
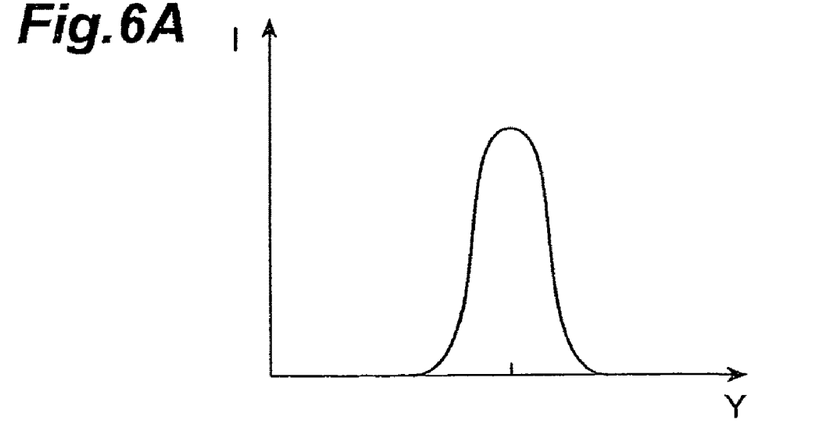
FIG. 6A is a graph depicting a relationship between the position Y and the laser light intensity I.

FIG. 5A is a plan view depicting the optical wave guide (core), and FIG. 6A is a graph showing a relationship of a position Y on a measurement line indicated by the dash and dotted line and the laser light intensity I in FIG. 5A. This measurement line does not pass on the magnetic pole 6C, as shown in FIG. 5A, and therefore the light intensity distribution shown in FIG. 6A shows a state before the laser light intensity attenuates.

The area BS indicated by the dotted line in FIG. 5A shows an area to which the laser beams are irradiated according to a comparison example. In the comparison example, the center area of the area BS has the light distribution of which intensity I is highest. The irradiated laser beams propagate from the area BS to the plasmon antenna 8 along the negative direction of the Z axis.

The magnetic pole 6C positions in the middle of propagation of the laser beams LB which propagate in the core 4. Because of the obstructing magnetic pole 6C, the laser beams having the center area of which intensity is highest are absorbed or scattered, as shown by the arrow marks, which interrupts the laser beam from reaching the plasmon antenna 8, and energy transmission efficiency to the plasmon antenna 8 deteriorates. The remaining laser beams are reflected by the side face of the core 4, and reach the plasmon antenna 8.

Figure 5B:
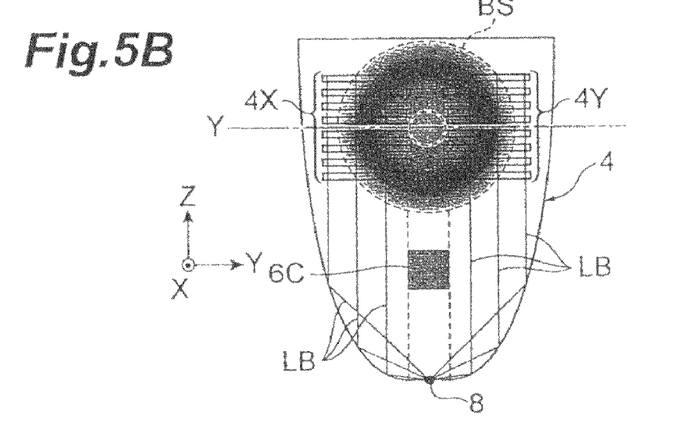
FIG. 5B is a plan view depicting an optical wave guide (core).
Figure 6B:
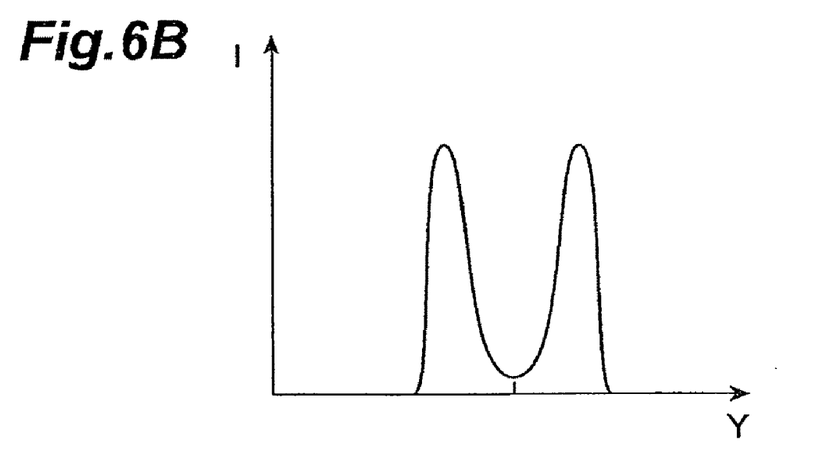
FIG. 6B is a graph depicting a relationship between the position Y and the laser light intensity I.

FIG. 5B is a plan view depicting the optical wave guide (core), and FIG. 6B is a graph showing a relationship of a position Y on a measurement line indicated by the dash and dotted line and the laser light intensity I in FIG. 5B. This measurement line does not pass on the magnetic pole 6C, as shown in FIG. 5B, and therefore the light intensity distribution shown in FIG. 6B shows a state before the laser light intensity attenuates.

This is an irradiation area BS according to the present embodiment, where the intensity I of the center area of the irradiation area BS is low, and the intensity I of the peripheral area is high. In this case, most of the laser beams which propagate inside the core 4 are not irradiated onto the magnetic pole 6C, and energy transmission efficiency to the plasmon antenna 8 improves.

In other words, according to this example, the two-dimensional form of the laser light intensity distribution on the area where the diffraction gratings 4X and 4Y are disposed is a ring. That is, according to this example, a laser element that can generate a light distribution in a ring shape is used, and this laser element has a light distribution which has two intensity peaks, as shown in FIG. 6B. This two-dimensional distribution is an intensity distribution form of lights emitted from the laser element itself. This two-dimensional distribution form may be a circle or ellipse where the intensity at the center portion is relatively low. In this case, the laser light intensity distribution in the area where the diffraction gratings 4X and 4Y are disposed has two intensity peaks along the width direction (Y axis direction) of the optical wave guide. According to the present embodiment, most of the laser beams LB are reflected by the side face of the core 4, and are condensed and reach the plasmon antenna 8.

Figure 5C:
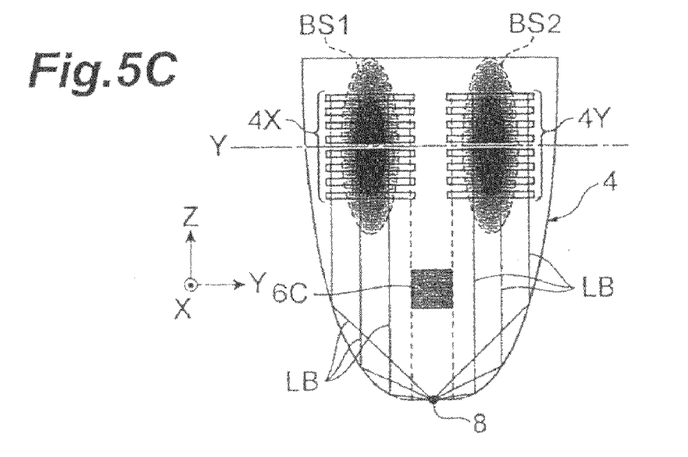
FIG. 5C is a plan view depicting an optical wave guide (core).
Figure 6C:
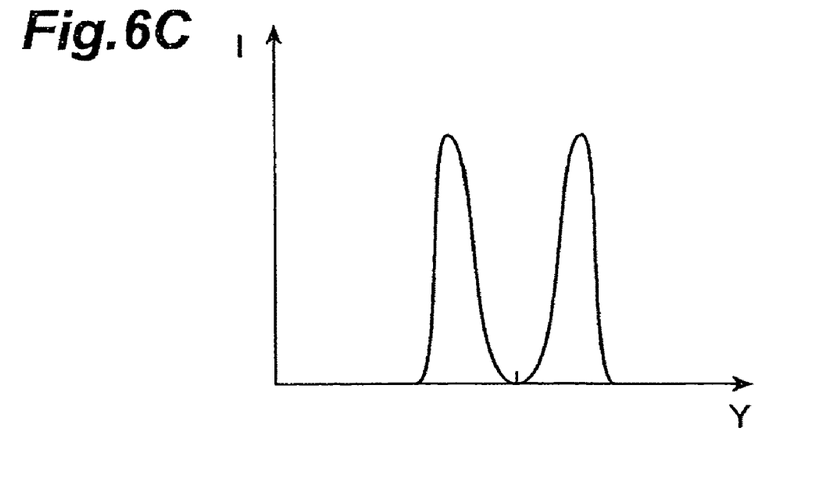
FIG. 6C is a graph depicting a relationship between the position Y and the laser light intensity I.

FIG. 5C is a plan view depicting the optical guide (core), and FIG. 6C is a graph showing a relationship of a position Y on a measurement line indicated by the dash and dotted line and the laser light intensity I in FIG. 5C. This measurement line does not pass on the magnetic pole 6C, as shown in FIG. 5B, and therefore the light intensity distribution shown in FIG. 6B shows a state before the laser light intensity attenuates.

This is an irradiation area BS according to another embodiment, where the two irradiation areas BS1 and BS2 are separated along the Y axis direction, and an intensity I of the area there between is lower. In this case as well, most of the laser beams that propagate in the core 4 are not irradiated to the magnetic pole 6C, and the energy transmission efficiency to the plasmon antenna 8 improves. In the form of FIG. 6C as well, most of the laser beams LB are reflected by the side face of the core 4, and are condensed and reach the plasmon antenna 8.

In other words, the two-dimensional form of the laser light intensity distribution in the area where the diffraction gratings 4X and 4Y are disposed is two ellipses (including circles) which are separated along the width direction of the optical wave guide. This two-dimensional distribution is a form of intensity distribution of the emitted lights of the laser element itself. In this case as well, the laser light intensity distribution in the area where the diffraction gratings 4X and 4Y are disposed has two intensity peaks along the width direction of the optical wave guide.

As mentioned above, according to the above mentioned two embodiments (FIG. 5B and FIG. 5C), the light distribution having two peaks, shown in FIG. 6B and FIG. 6C, are acquired using the laser element having two intensity peaks. As described above, the thermally assisted magnetic head has the plasmon antenna 8, the optical wave guide having the plasmon antenna 8 disposed at the tip thereof, the diffraction gratings 4X and 4Y disposed in or on the optical wave guide, and the laser element 3 disposed at a position to irradiate laser beams to the diffraction gratings 4X and 4Y (see FIG. 4), and the laser light intensity distribution in the area where the diffraction gratings 4X and 4Y has at least two intensity peaks along the width direction of the optical wave guide.

According to the above mentioned thermally assisted magnetic head, the laser beams LB irradiated onto the diffraction gratings 4X and 4Y are diffracted in a desired way, propagate in the optical wave guide, and are irradiated onto the plasmon antenna 8. Since the laser light intensity distribution has at least two intensity peaks, laser light quantity to be absorbed or scattered by a laser beam absorbing or scattering body, such as a magnetic pole, disposed on a line extended from the trough position between the intensity peaks in a propagation direction of the laser beams, decreases, and many laser beams are reflected by the reflectors 20A and 20B (see FIG. 3), and are condensed to the plasmon antenna 8. Therefore the intensity of the near field light generated by irradiating the laser beams onto the plasmon antenna 8 increases.

It is preferable that the laser element 3 is a photonic crystal surface emitting semiconductor laser. In the case of a photonic crystal surface emitting semiconductor laser, a desired two-dimensional form of the laser beams can be acquired by changing the cyclic structure of the photonic crystal layer, which is suitable to acquire the above mentioned light intensity distribution.

Figure 7:
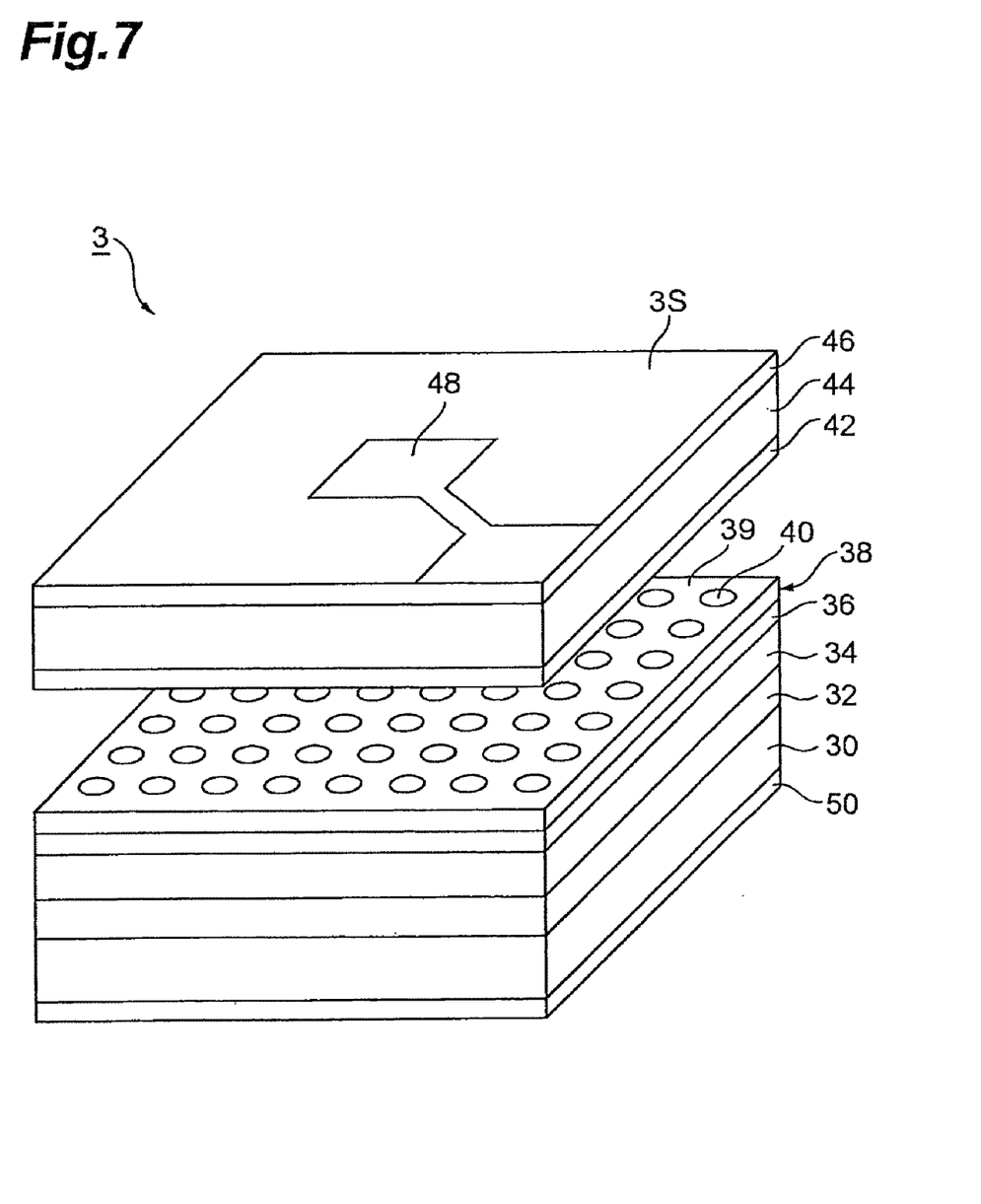
FIG. 7 is a perspective view depicting an example of a photonic crystal surface emitting semiconductor laser.
Figure 8:
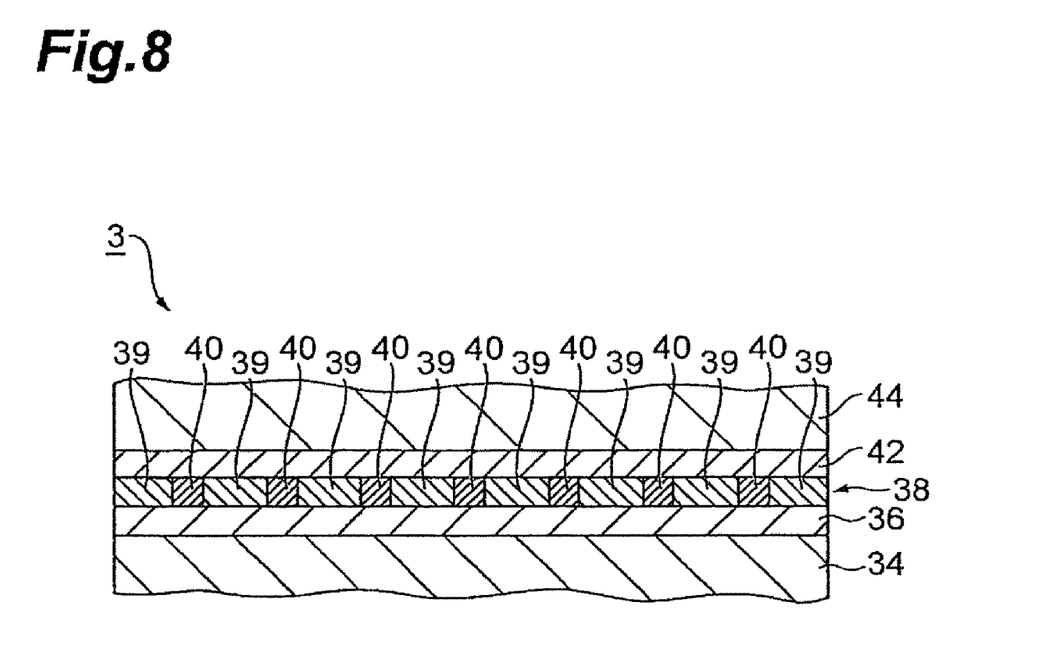
FIG. 8 is a cross-sectional view depicting an area near the photonic crystal layer of the photonic crystal surface emitting semiconductor laser in FIG. 7.

FIG. 7 is a perspective view depicting an example of the photonic crystal surface emitting semiconductor laser in a state where the photonic crystal layer and the layer thereon are separated. FIG. 8 is a vertical cross-sectional view depicting an area near the photonic crystal layer of the photonic crystal surface emitting semiconductor laser in FIG. 7.

As shown in FIG. 7, the photonic crystal surface emitting laser 3 is comprised of a bottom clad layer (substrate) 30, which is a compound semiconductor, such as an n-type AlGaAs, a top clad layer 44, which is a compound semiconductor, such as a p-type AlGaAs, an active layer 34, which is a compound semiconductor disposed between the bottom clad layer 30 and the top clad layer 44, and a photonic crystal layer 38 disposed between the top clad layer 44 and the active layer 34.

The active layer 34 has multiple quantum wells which is comprised of a multi-layer structure of an InGaAs layer and GaAs layer, for example. A spacer layer 32, made of an n-type GaAs, for example, is disposed between the bottom clad layer 30 and the active layer 34, and a spacer layer 36, made of a p-type GaAs, for example, is disposed between the active layer 34 and the photonic crystal layer 38, and a spacer layer 42, made of a p-type GaAs, for example, is disposed between the photonic crystal layer 38 and the top clad layer 44. A p-type electrode 48 is disposed via a contact layer 46, made of a p-type GaAs, for example, on the top clad layer 44, and an n-type electrode 50 is disposed on the back face of the bottom clad layer 30.

As FIG. 7 and FIG. 8 show, the photonic crystal layer 38 is a two-dimensional photonic crystal layer. Specifically, the photonic crystal layer 38 has a base material layer 39 made of p-type GaAs, for example, and a plurality of holes (through holes) 40 formed in the base material layer 39. The plurality of holes 40 penetrate the base material layer 39 in the thickness direction thereof, and the cross-sectional thereof is circular. The plurality of holes 40 are two-dimensionally and cyclically disposed in the plane of the base material layer 39, in the intersection positions of a square lattice, for example.

The thickness of the photonic crystal layer 38 is 0.1 to 1 μm, for example. The diameter of the cross-section of the hole 40 is about 0.05 to 0.5 μm, for example. The oscillation wavelength of the photonic crystal surface emitting semiconductor laser 3 is determined by the cycle of the array of the holes 40, as mentioned later. The cycle of the array of the holes 40 is 0.1 to 0.8 μm, for example.

If voltage is applied between the electrode 48 and the electrode 50 of the photonic crystal surface emitting semiconductor laser 3, electrons and holes in the active layer 34 are recombined, and light is generated. Out of this light, light which has a wavelength similar to the cycle of the array of holes 40 resonates in the photonic crystal layer 38.

Concretely, if lights having a similar wavelength as the cycle of the array of the holes 40 advance from a hole 40 to another hole 40, the lights are diffracted in a 180° direction, 90° direction and −90° direction with respect to the traveling direction by the function of the cyclic structure of the plurality of holes 40. The lights which propagate in these four directions couple with each other, and two-dimensionally and optically resonate in the photonic crystal layer 38. These two-dimensionally and optically resonating lights are also diffracted in the thickness direction of the photonic crystal layer 38 by the function of the cyclic structure of the plurality of holes 40, so the laser beams are output from the light emitting surface 3S, which is the surface of the contact layer 46 in a direction perpendicular to the light emitting surface 3S.

Compared with a surface emitting semiconductor laser not having a photonic crystal layer, the photonic crystal surface emitting semiconductor laser 3 has a characteristic in that a spot diameter of the emission lights in a single mode operation can be increased, and the spread angle of the emission lights can be decreased (that is, the degree of parallelization can be increased). As mentioned above, the efficiency of optical coupling by the diffraction grating 2 is higher as the spread angle of the emission lights LB become smaller, and as the spot diameter of the emission lights LB becomes greater.

Therefore it is preferable that the spot diameter of the emission lights LB is 40 μm or more, more preferably 100 μm or more. It is also preferable that the spread angle of the emission lights LB is 5° or less, and more preferably 1.5° or less. According to the photonic crystal surface emitting semiconductor laser 3, the preferable conditions of the spot diameter and spread angle of the emission lights LB can easily be satisfied. The magnetic record medium 10 can be heated to a higher temperature by using the photonic crystal surface emitting semiconductor laser 3, and increasing the efficiency of optical coupling using the diffraction gratings 4X and 4Y, so the thermally assisted magnetic head 21, which can support higher recording densities, can be implemented. The upper limit of the spot diameter of the laser beams LB is not especially limited, but is about 150 μm in terms of applying the photonic crystal surface emitting semiconductor laser 3 to the magnetic head.

Figure 9A:
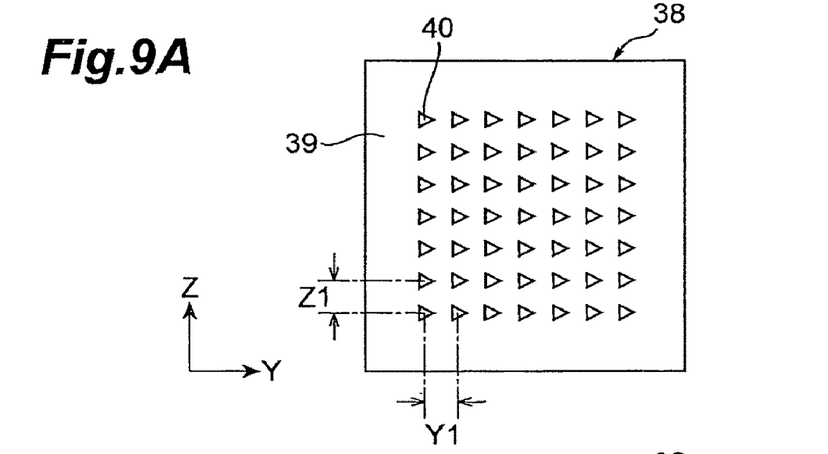
FIG. 9A is a plan view depicting a photonic crystal layer 38 according to a comparison example.
Figure 10A:
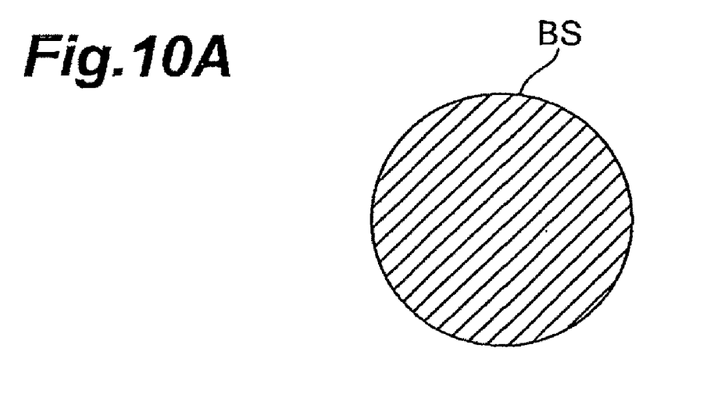
FIG. 10A is a plan view depicting the laser light intensity distribution in the case of 9A.

FIG. 9A is a plan view depicting a photonic crystal layer 38 according to a comparison example, and FIG. 10A is a plan view depicting the laser light intensity distribution in the case of FIG. 9A.

The two-dimensional form of the hole 40 is a triangle, and the cycle (interval) Y1 of the two-dimensionally arrayed holes 40 in the Y axis direction and the cycle (interval) Z1 of the holes 40 in the Z axis direction are the same. Here "triangle" simply means a form having three angles, and does not refer to a triangle according to a strict mathematical definition. In this case, a circular laser light intensity distribution (irradiation area) BS is acquired on the diffraction gratings, as shown in FIG. 10A. Each distance is a distance between the center of gravity positions of the respective holes 40.

Figure 9B:
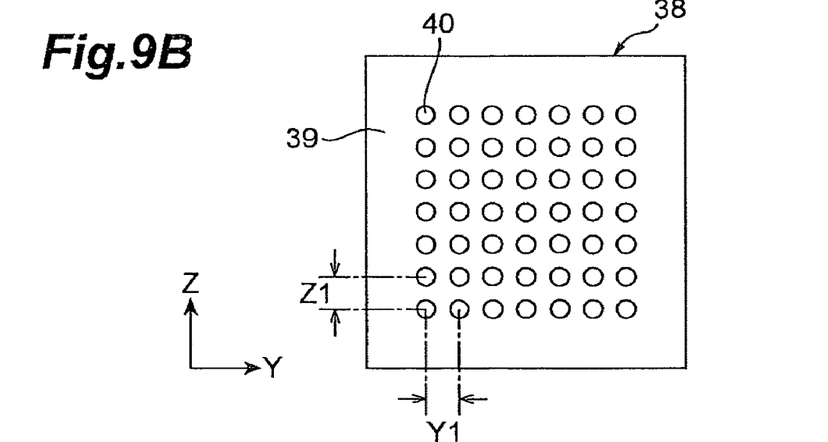
FIG. 9B is a plan view depicting a photonic crystal layer 38 according to an embodiment.
Figure 10B:
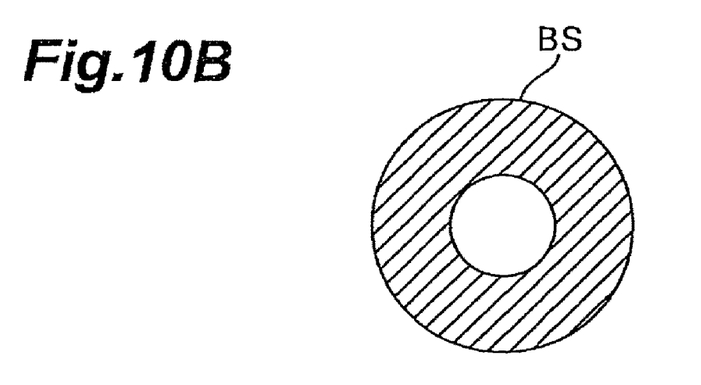
FIG. 10B is a plan view depicting the laser light intensity distribution in the case of 9B.

FIG. 9B is a plan view depicting a photonic crystal layer 38 according to an embodiment, and FIG. 10B is a plan view depicting the laser light intensity distribution in the case of FIG. 9B.

The two-dimensional form of the hole 40 is an ellipse (including a circle), and the cycle (interval) Y1 of the two-dimensionally arrayed holes 40 in the Y axis direction and the cycle (interval) Z1 of the holes 40 in the Z axis direction have a relationship in the following ranges.

Y1: 0.1 to 0.8 μm
Z1: 0.1 to 0.8 μm

Here the ellipse simply means a smooth closed curve without any substantial angles, and does not refer to an ellipse according to a strict mathematical definition. In this case, a ring form laser light intensity distribution (irradiation area) BS is acquired on the diffraction gratings, as shown in FIG. 10B.

In other words, the photonic crystal layer 38 has the plurality of holes 40 which extend in the thickness direction, and a two-dimensional form of each hole 40 is a circle, and in this case, the two-dimensional form of the laser beams to be emitted can be a ring.

Figure 9C:
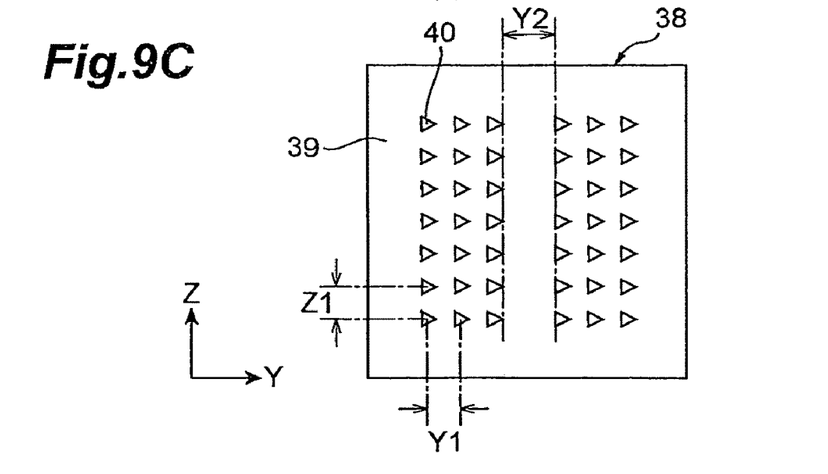
FIG. 9C is a plan view depicting a photonic crystal layer 38 according to an embodiment.
Figure 10C:
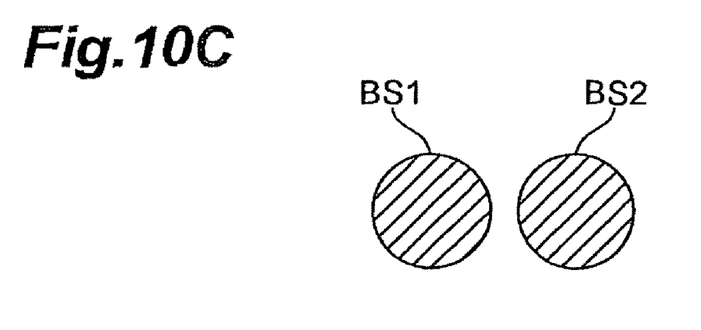
FIG. 10C is a plan view depicting the laser light intensity distribution in the case of 9C.

FIG. 9C is a plan view depicting a photonic crystal layer 38 according to another embodiment, and FIG. 10C is a plan view depicting the laser light intensity distribution in the case of FIG. 9C.

The two-dimensional form of the hole 40 is a triangle, and the cycle (interval) Y1 of the two-dimensionally arrayed holes 40 in the Y axis direction and the cycle (interval) Z1 of the hole 40 in the Z axis direction have a relationship in the following ranges.

Y1: 0.1 to 0.8 μm
Z1: 0.1 to 0.8 μm

It is assumed that the area at the left is the first area, and the area at the right is the second area, then the distance Y2 between the first area and the second area is greater than the distance Y1, and is in the following range.

Y2: 0.18 to 0.36 μm

In this case, circular or elliptical laser light intensity distributions (irradiation areas) BS1 and BS2 are acquired on the diffraction gratings, as shown in FIG. 10C.

In other words, the photonic crystal layer 38 has the first area and the second area, each of the first area and second area has a plurality holes 40 which extend in the thickness direction, and the two-dimensional form of each hole 40 is a triangle, and the first area and second area are separated by distance Y2, which is greater than the distance Y1 between the adjacent through holes in each area. In this case, two elliptical (including circular) laser light intensity distributions BS1 and BS2 can be formed in the two areas, including the above mentioned diffraction gratings corresponding to the first area and second area.

In the above embodiment, the laser beams having two intensity peaks are irradiated, but even laser beams having three or more intensity peaks in total with a lower intensity peak than the rest of the peaks can also implement the above mentioned effect.

The invention claimed is:

1. A thermally assisted magnetic head, comprising:
a plasmon antenna;
an optical wave guide having the plasmon antenna installed at the tip thereof, wherein the optical wave guide has a through hole penetrating in the thickness direction thereof, and a core of the optical wave guide has two side faces, a two-dimensional shape of the two side faces forms a part of a parabola;
reflection films formed on the side faces, the reflection films being made of Al;
a magnetic pole passing through the through hole of the optical wave guide, wherein the magnetic pole comprises a laser beam absorbing or scattering body, the magnetic pole including two or three of Ni, Fe, and Co;
a diffraction grating which is disposed in or on the optical wave guide; and
a laser element which is disposed at a position to irradiate laser beams onto the diffraction grating, and comprises a photonic crystal surface emitting semiconductor laser, the laser beams propagating toward a recording medium, wherein a two-dimensional shape of the laser beams on the diffraction grating is a ring or two ellipses, wherein
a laser light intensity distribution in an area in which the diffraction grating is disposed has at least two intensity peaks in a width direction of the optical wave guide,
the width direction is a track width direction of the recording medium, the magnetic pole being arranged on a line, the line extending in a propagating direction of the laser beams from a trough position between the intensity peaks,
the photonic crystal surface emitting semiconductor laser comprises:
a bottom clad layer comprising a compound semiconductor;
a top clad layer comprising a compound semiconductor;
an active layer, disposed between the bottom clad layer and the top clad layer; and
a photonic crystal layer disposed between the top clad layer and the active layer,
the photonic crystal layer has a plurality of through holes penetrating in a thickness direction, and a two-dimensional form of each through hole is a circle,
a plan view of the photonic crystal layer is defined by Y-axis and Z-axis,
the through holes are aligned in the Y-axis and the Z-axis,
an interval Y1 between the through holes in the Y-axis direction is in a range between 0.1 to 0.8 µm, and
an interval Z1 between the through holes in the Z-axis direction is in a range between 0.1 to 0.8 µm.

2. A thermally assisted magnetic head, comprising:
a plasmon antenna;
an optical wave guide having the plasmon antenna installed at the tip thereof, wherein the optical wave guide has a through hole penetrating in the thickness direction thereof, and a core of the optical wave guide has two side faces, a two-dimensional shape of the two side faces forms a part of a parabola;
reflection films formed on the side faces, the reflection films being made of Al;
a magnetic pole passing through the through hole of the optical wave guide, wherein the magnetic pole comprises a laser beam absorbing or scattering body, the magnetic pole including two or three of Ni, Fe, and Co;
a diffraction grating which is disposed in or on the optical wave guide; and
a laser element which is disposed at a position to irradiate laser beams onto the diffraction grating, and comprises a photonic crystal surface emitting semiconductor laser, the laser beams propagating toward a recording medium, wherein a two-dimensional shape of the laser beams on the diffraction grating is a ring or two ellipses, wherein
a laser light intensity distribution in an area in which the diffraction grating is disposed has at least two intensity peaks in a width direction of the optical wave guide,
the width direction is a track width direction of the recording medium, the magnetic pole being arranged on a line, the line extending in a propagating direction of the laser beams from a trough position between the intensity peaks,
the photonic crystal surface emitting semiconductor laser comprises:
a bottom clad layer comprising a compound semiconductor;
a top clad layer comprising a compound semiconductor;
an active layer, disposed between the bottom clad layer and the top clad layer; and
a photonic crystal layer disposed between the top clad layer and the active layer,
the photonic crystal layer has a first area and a second area, each of the first and second areas has a plurality of through holes penetrating in a thickness direction, and a two-dimensional form of each through hole is a triangle, the first and second areas being separated by a distance greater than the distance between adjacent through holes in each area,
a plan view of the photonic crystal layer is defined by Y-axis and Z-axis,
the through holes are aligned in the Y-axis and the Z-axis,
an interval Y1 between the through holes in the Y-axis direction is in a range between 0.1 to 0.8 µm,
an interval Z1 between the through holes in the Z-axis direction is in a range between 0.1 to 0.8 µm, and
a distance Y2 between the first area and the second area is greater than the interval Y1, and is in a range between 0.18 o 0.36 µm.

* * * * *